(12) United States Patent
Furukawa et al.

(10) Patent No.: US 8,340,471 B2
(45) Date of Patent: Dec. 25, 2012

(54) PARAMETER CONTROL PROCESSING APPARATUS AND IMAGE PROCESSING APPARATUS

(75) Inventors: Eiji Furukawa, Tokyo (JP); Masayuki Tanaka, Tokyo (JP); Masatoshi Okutomi, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 514 days.

(21) Appl. No.: 12/700,952

(22) Filed: Feb. 5, 2010

(65) Prior Publication Data

US 2010/0239184 A1 Sep. 23, 2010

(30) Foreign Application Priority Data

Mar. 17, 2009 (JP) .................................. 2009-64921

(51) Int. Cl.
*G06K 9/32* (2006.01)
(52) U.S. Cl. ....... 382/299; 382/274; 382/276; 358/3.26; 358/3.27
(58) Field of Classification Search .................. 382/274, 382/275, 282, 299; 358/3.26, 3.27, 463
See application file for complete search history.

(56) References Cited

U.S. PATENT DOCUMENTS

| 6,529,613 | B1 * | 3/2003 | Astle .............................. 382/103 |
| 7,702,821 | B2 * | 4/2010 | Feinberg et al. ................ 710/13 |
| 7,792,598 | B2 * | 9/2010 | Khosla et al. ................... 700/50 |
| 7,999,873 | B2 * | 8/2011 | Oyama et al. ................. 348/340 |

FOREIGN PATENT DOCUMENTS

WO 2004/063991 A1 7/2004

OTHER PUBLICATIONS

David Capel, "Image Mosaicing and Super-resolution", Springer, pp. 1-168, Chapters 1-6.
Sung Cheol Park et al., "Super-Resolution Image Reconstruction: A Technical Overview", IEEE Signal Processing Magazine, May 2003, pp. 21-36.

* cited by examiner

*Primary Examiner* — Yosef Kassa
(74) *Attorney, Agent, or Firm* — Sughrue Mion, PLLC (57) ABSTRACT

Disclosed is an image processing apparatus that is capable of effectively generating a high-resolution image with high image quality from multiple low-resolution images having displacements by an iterative reconstruction processing based on a reconstruction-based super-resolution processing method.

22 Claims, 7 Drawing Sheets

PARAMETER CONTROL PROCESSING APPARATUS AND IMAGE PROCESSING APPARATUS

TECHNICAL FIELD

The present invention relates to a digital image processing technology that is used in electronic imaging devices and image systems, more particularly, to a parameter control processing technology that is used for effectively generating a high-resolution image with high image quality from multiple low-resolution images, and an image processing technology that utilizes the said parameter control processing technology.

BACKGROUND TECHNIQUE

The image processing technology that reconstructs one high-resolution image from multiple low-resolution images having displacements, is called the super-resolution processing (see Non-Patent Document 1), and many technologies have been developed conventionally.

For example, as described in Non-Patent Document 2, the typical super-resolution processing methods such as the ML (Maximum-Likelihood) method, the MAP method (Maximum A Posterior) method and the POCS (Projection Onto Convex Sets) method are proposed.

The ML method is a method that defines an evaluation function as square error between the estimated pixel value from an assumed high-resolution image and the actually observed pixel value, and sets a high-resolution image minimizing the evaluation function as an estimated image. In other words, the ML method is a super-resolution processing method based on the principle of maximum likelihood estimation.

Further, the MAP method is a method that estimates the high-resolution image minimizing an evaluation function which added probability information of the high-resolution image to square error. In other words, the MAP method is a super-resolution processing method that estimates the high-resolution image as an optimization problem maximizing posterior probability by using certain prior information for the high-resolution image.

Moreover, the POCS method is a super-resolution processing method that obtains the high-resolution image by generating simultaneous equations about the pixel values of the low-resolution image and the high-resolution image and then solving the simultaneous equations successively.

All of the above-described super-resolution processing methods have the common features of assuming a high-resolution image (an initial high-resolution image), estimating its pixel value for each pixel of all low-resolution images based on a point spread function (PSF) obtained from a camera model from the assumed high-resolution image and then searching for a high-resolution image by minimizing the difference between the estimated value and the observed pixel value (the observed value). Therefore, these super-resolution processing methods are called reconstruction-based super-resolution processing methods.

All of the above-described reconstruction-based super-resolution processing methods reconstruct a high-resolution image by the super-resolution processing (an iterative reconstruction processing) that needs an initial high-resolution image (an initial image).

By the way, as for the image data (middle images) that is obtained by registering these multiple low-resolution images in a high-resolution image space based on displacements between multiple low-resolution images, its pixel densities become non-uniform due to influences of motions of subjects, the number of used low-resolution images, a displacement detection processing, and a reliable pixel selection processing etc. That is to say, the pixel density of its image data in the high-resolution image space, is different by the pixel position.

In the case of using an image that is generated based on the image data (middle images) having such non-uniform pixel densities as an initial image of a reconstruction-based super-resolution processing method, the super-resolution processing (an iterative reconstruction processing) by an existing reconstruction-based super-resolution processing method, uses constant values of both the weight coefficient of the constraint condition relating to the iterative reconstruction processing and the termination condition of the iterative reconstruction processing that do not depend on the pixel density, without considering that the pixel densities of the middle images which become the base of the initial image are non-uniform.

As a result, by performing the super-resolution processing (the iterative reconstruction processing) for a region of the initial image that corresponds to a region of the image data (the middle image) obtained by registering multiple low-resolution images in the high-resolution image space where the pixel density is high, conversely, that region of the initial image becomes blurred, a problem that the image quality of that region of the initial image becomes degraded than an interpolated image obtained by a simple interpolation processing occurs.

Further, the iterative reconstruction processing will be performed more than required, therefore there is also a problem that the computation cost for reconstructing a high-resolution image becomes large and it is impossible to effectively generate a high-resolution image.

The present invention has been developed in view of the above described circumstances, and an object of the present invention is to provide a parameter control processing apparatus which adaptively controls parameters relating to the image processing depending on pixel densities of the image data (middle images) obtained by registering multiple low-resolution images in the high-resolution image space.

Further, another object of the present invention is to provide an image processing apparatus which is capable of effectively generating a high-resolution image with high image quality by adaptively controlling parameters relating to the iterative reconstruction processing by the parameter control processing apparatus of the present invention and performing the iterative reconstruction processing based on controlled parameters in the case of generating one high-resolution image from multiple low-resolution images by the super-resolution processing (the iterative reconstruction processing) based on a reconstruction-based super-resolution processing method.

DISCLOSURE OF THE INVENTION

The present invention relates to a parameter control processing apparatus that is used in an image processing apparatus performing a predetermined image processing based on multiple low-resolution images having displacements. The above object of the present invention is effectively achieved by the construction that said parameter control processing apparatus characterized by comprising: a registration processing unit for computing displacement information in a high-resolution image space that is used for registering said multiple low-resolution images in said high-resolution image space, a middle image generating unit for generating middle images by registering said multiple low-resolution images in said high-resolution image space based on said computed displacement information in said high-resolution image space, a pixel density measuring unit for measuring pixel densities of said generated middle images, and a parameter controlling unit for adaptively controlling parameters relating to said predetermined image processing depending on said measured pixel densities of said middle images. Further, the above object of the present invention is also effectively achieved by the construction that said middle images are an average image and a weighted image that include undefined pixels in said high-resolution image space.

Further, the present invention relates to an image processing apparatus for generating a high-resolution image from multiple low-resolution images having displacements by an iterative reconstruction processing based on a reconstruction-based super-resolution processing method. The above object of the present invention is effectively achieved by the construction that said image processing apparatus characterized by comprising: a registration processing unit for computing displacement information in a high-resolution image space that is used for registering said multiple low-resolution images in said high-resolution image space, a middle image generating unit for generating middle images by registering said multiple low-resolution images in said high-resolution image space based on said computed displacement information in said high-resolution image space, an initial image generating unit for generating an initial image that all pixels are defined pixels based on said middle images, a pixel density measuring unit for measuring pixel densities of said generated middle images, a parameter controlling unit for adaptively controlling parameters relating to said iterative construction processing depending on said measured pixel densities of said middle images, and an iterative reconstruction processing unit for generating said high-resolution image by performing said iterative construction processing based on said parameters with respect to said initial image.

Moreover, the above object of the present invention is also effectively achieved by the construction that said middle image generating unit generates an average image and a weighted image that include undefined pixels in said high-resolution image space by arranging each pixel of said multiple low-resolution images and its weight in said high-resolution image space respectively based on said computed displacement information in said high-resolution image space, said generated average image and said generated weighted image are said middle images. Further, the above object of the present invention is also effectively achieved by the construction that said parameter is a weight coefficient of a constraint condition for smoothness of edges and false color suppression relating to said iterative reconstruction processing, said parameter controlling unit varies said weight coefficient of said constraint condition depending on said pixel density. Further, the above object of the present invention is also effectively achieved by the construction that said parameter is a termination condition parameter of said iterative reconstruction processing, said parameter controlling unit varies said termination condition parameter depending on said pixel density. Further, the above object of the present invention is also effectively achieved by the construction that said termination condition parameter is iteration count of said iterative reconstruction processing. Further, the above object of the present invention is also effectively achieved by the construction that said termination condition parameter is a threshold of a convergence condition of said iterative reconstruction processing. Further, the above object of the present invention is also effectively achieved by the construction that said pixel density measuring unit sets all pixels of said middle images as a pixel of interest respectively, and measures a pixel density for each pixel of interest. Further, the above object of the present invention is also effectively achieved by the construction that said pixel density measuring unit sets said middle images as multiple regions of interest, and measures a pixel density for each region of interest.

DESCRIPTION OF THE NUMERALS 1 image processing apparatus
100 registration processing unit
110 middle image generating unit
120 initial image generating unit
130 pixel density measuring unit
140 parameter controlling unit
150 iterative reconstruction processing unit
160 memory unit

THE BEST MODE FOR CARRYING OUT THE INVENTION

The present invention relates to a parameter control processing technology that is used for effectively generating one high-resolution image with high image quality from multiple low-resolution images having displacements, and an image processing technology that utilizes the said parameter control processing technology.

Concretely, the present invention relates to a parameter control processing apparatus and a parameter control processing method that adaptively control parameters relating to the image processing depending on pixel densities of the image data (middle images) obtained by registering multiple low-resolution images in the high-resolution image space.

Further, the present invention relates to an image processing apparatus and an image processing method that are capable of effectively generating a high-resolution image with high image quality by adaptively controlling parameters relating to the iterative reconstruction processing by the parameter control processing apparatus of the present invention and performing the iterative reconstruction processing based on controlled parameters in the case of generating one high-resolution image from multiple low-resolution images by the super-resolution processing (the iterative reconstruction processing) based on a reconstruction-based super-resolution processing method.

The following is a detailed description of preferred embodiments for carrying out the present invention, with reference to the accompanying drawings.

Figure 1:
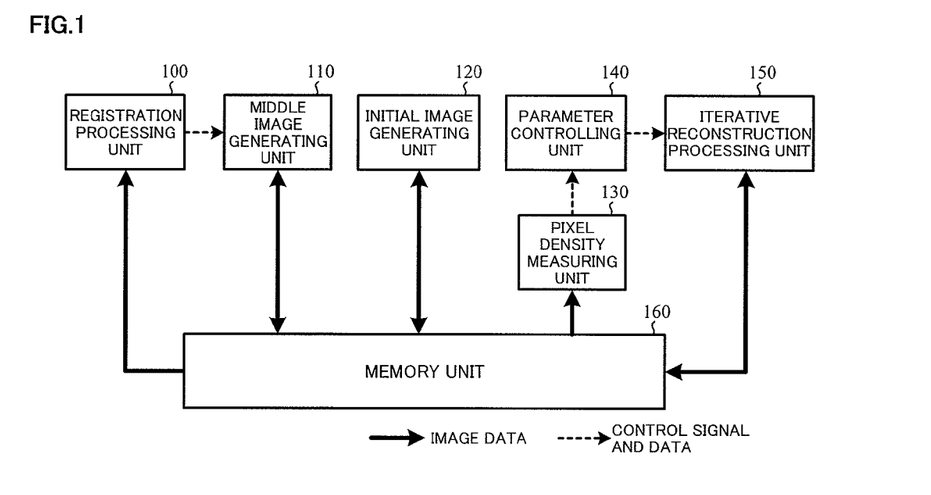
FIG. 1 is a block constitution diagram that shows a preferred embodiment of an image processing apparatus according to the present invention.
Figure 2:
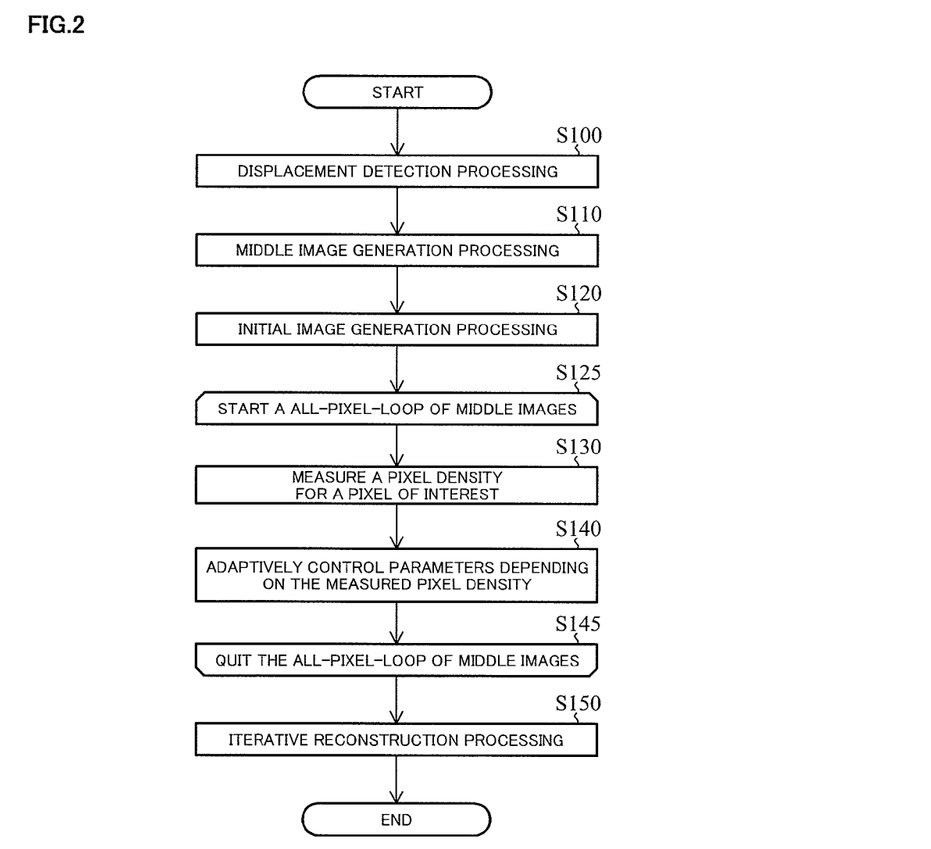
FIG. 2 is a flow diagram that shows the processing flow of the image processing apparatus of the present invention shown in FIG. 1.

FIG. 1 is a block constitution diagram that shows a preferred embodiment of an image processing apparatus according to the present invention (hereinafter also simply referred to as "the image processing apparatus of the present invention" or "the image processing apparatus 1"). Further, FIG. 2 is a flow diagram that shows the processing flow of the image processing apparatus of the present invention shown in FIG. 1. Hereinafter, we concretely describe the image processing apparatus of the present invention (the image processing apparatus 1) with referent to FIG. 1 and FIG. 2.

As shown in FIG. 1, the image processing apparatus 1 comprises a registration processing unit 100, a middle image generating unit 110, an initial image generating unit 120, a pixel density measuring unit 130, a parameter controlling unit 140, an iterative reconstruction processing unit 150 and a memory unit 160, and effectively generates one high-resolution image with high image quality from multiple low-resolution images having displacements.

The memory unit 160 of the image processing apparatus 1 is used for storing the image data (images). It is possible to store various images that are used in the present invention or generated by the present invention (for example, images such as low-resolution images, middle images, the initial image and the high-resolution image) in the memory unit 160. In addition, as the memory unit 160, for example, it is possible to use a recording medium such as a semiconductor memory.

In the present invention, multiple low-resolution images are preliminarily stored in the memory unit 160, and then, one image that is selected from multiple low-resolution images stored in the memory unit 160 is set as a basis image which becomes a criterion for the registration processing and all remaining low-resolution images except the basis image are set as reference images.

As shown in FIG. 1, in the image processing apparatus 1, at first, the registration processing unit 100 reads out multiple low-resolution images (the basis image and multiple reference images) from the memory unit 160, and then detects displacements between the basis image and each reference image with respect to the basis image and multiple reference images which are read out (see step S100 of FIG. 2), and further computes displacement information in the high-resolution image space that is used for registering multiple low-resolution images in the high-resolution image space based on the detected displacements between the basis image and each reference image. Furthermore, the displacement information in the high-resolution image space that is computed in the registration processing unit 100, is input into the middle image generating unit 110.

In the present invention, in order to register multiple low-resolution images in the high-resolution image space, it is necessary to detect sub-pixel displacements between the basis image and each reference image.

Therefore, as one concrete example of the displacement detection processing performed in the registration processing unit 100, for example, at first the basis image and each reference image are preliminarily magnified by an interpolation processing (for example, an interpolation processing by the cubic interpolation method), and then the sub-pixel displacements between the basis image and each reference image that are magnified by the block matching method, are detected.

Further, as another concrete example of the displacement detection processing, for example, by using image sub-pixel matching technology disclosed in Patent Document 1, the sub-pixel displacements between the basis image and each reference image are detected.

Of course, it goes without saying that in the registration processing unit 100, it is necessary to convert the sub-pixel displacements between the basis image and each reference image detected by the above-described two concrete examples into the displacement information in the high-resolution image space.

Next, the middle image generating unit 110 reads out multiple low-resolution images from the memory unit 160, and then generates an average image and a weighted image that include undefined pixels in the high-resolution image space by registering the multiple low-resolution images which were read out in the high-resolution image space, i.e. by arranging each pixel of the multiple low-resolution images and its weight in the high-resolution image space respectively, based on the displacement information in the high-resolution image space that is input (see step S110 of FIG. 2).

Hereinafter, the average image and the weighted image that include undefined pixels in the high-resolution image space are also simply referred to as middle images without distinguishing the average image and the weighted image. Further, two middle images that are generated in the middle image generating unit 110 (i.e. the average image and the weighted image that include undefined pixels in the high-resolution image space), are stored in the memory unit 160.

Here, we describe a middle image generation processing for generating the average image and the weighted image that include undefined pixels (see step S110 of FIG. 2).

The middle image generation processing, firstly sets an image (image data) obtained by arranging each pixel of the multiple low-resolution images in the high-resolution image space based on the displacement information in the high-resolution image space as the average image. The number of pixels of the average image is equal to the number of pixels of the high-resolution image space.

On this occasion, each pixel of the multiple low-resolution images is weighted, and then the weight of each pixel is also arranged in the high-resolution image space in the same way. An image (image data) obtained by arranging the weight of each pixel of the multiple low-resolution images in the high-resolution image space, is set as the weighted image. The number of pixels of the weighted image is equal to the number of pixels of the high-resolution image space.

With respect to weighting each pixel of the multiple low-resolution images, for every pixel, it is possible to determine reliability of displacements by re-evaluating the correlation between corresponding pixels based on displacements detected by a displacement detection processing and set from 0 to 1 weight depending on the determined reliability. Further, it is also possible to weight each pixel of the multiple low-resolution images depending on imaging time from the basis image which becomes a criterion for the registration processing.

With respect to the present invention, in the middle image generation processing for generating the average image and the weighted image, when arranging a certain pixel of the low-resolution image and its weight in the high-resolution image space respectively, in the case that other pixels and weights of the aforementioned other pixels are already arranged in the same position (pixel position) of the high-resolution image space, pixel values of the aforementioned other pixels and weights of the aforementioned other pixels are accumulated.

Therefore, due to factors such as the number of low-resolution images to use, the number of pixels of the high-resolution image space to register, weights of pixels of low-resolution images and motions of subjects, the average image and the weighted image that are generated by the middle image generation processing of the present invention, become non-uniform images in which defined pixels that pixel values are decided and undefined pixels that pixel values are not decided are mixed.

Next, the initial image generating unit 120 reads out the average image and the weighted image that include undefined pixels from the memory unit 160, estimates the pixel value of the undefined pixel of the average image by interpolating pixel values of defined pixels existing in the neighborhood of the aforementioned undefined pixel based on the read-out average image and the read-out weighted image that include undefined pixels, and then generates one average image that all pixels become defined pixels as the initial image (see step S120 of FIG. 2). That is to say, the initial image generated in the initial image generating unit 120 is an average image without the undefined pixel. Further, the initial image generated in the initial image generating unit 120, is stored in the memory unit 160.

Next, the pixel density measuring unit 130 reads out the average image and the weighted image that include undefined pixels from the memory unit 160, sets all pixels including all defined pixels and all undefined pixels from the read-out average image and the read-out weighted image that include undefined pixels, i.e. all pixels of the middle images as the pixel of interest respectively (see step S125 and step S145 of FIG. 2), and then measures the pixel density for each pixel of interest (see step S130 of FIG. 2). Further, pixel densities of all pixels of the middle images that are measured in the pixel density measuring unit 130 (hereinafter also simply referred to as the pixel densities of the middle images), are input into the parameter controlling unit 140.

Next, based on the pixel densities of all pixels of the middle images that are input, the parameter controlling unit 140 adaptively controls parameters relating to the iterative reconstruction processing performed in the iterative reconstruction processing unit 150 depending on the pixel density of each pixel of interest. That is to say, the parameter controlling unit 140 sets parameters relating to the iterative reconstruction processing performed for each pixel of interest depending on the measured pixel density of that pixel of interest (see step S140 of FIG. 2). Further, parameters of all pixels that are set in the parameter controlling unit 140, are input into the iterative reconstruction processing unit 150.

Finally, the iterative reconstruction processing unit 150 reads out the initial image from the memory unit 160, and then generates one sharpened high-resolution image without artifacts in edges by performing the iterative reconstruction processing (see step S150 of FIG. 2) based on the parameters of all pixels that are input so as to recover blurs, and at the same time sharpen edges and suppress false colors with respect to the read-out initial image. Further, the high-resolution image generated in the iterative reconstruction processing unit 150, is stored in the memory unit 160.

In addition, it goes without saying that it is possible to output the high-resolution image generated in the iterative reconstruction processing unit 150 to an external unit when necessary without storing the high-resolution image generated in the iterative reconstruction processing unit 150 in the memory unit 160.

As described above, we explained the preferred embodiment of the image processing apparatus according to the present invention in detail. In the above preferred embodiment of the present invention, the pixel density measuring unit 130 measures the pixel density for every pixel of interest, and the parameter controlling unit 140 adaptively controls parameters relating to the iterative reconstruction processing performed for every pixel of interest depending on the measured pixel density for every pixel of interest.

However, the present invention is not limited to the above preferred embodiment, for example, it is possible to use "a region of interest that consists of multiple pixels" in place of "a pixel of interest" used in the above preferred embodiment. That is to say, in the above preferred embodiment, all pixels of the middle images are set as the pixel of interest respectively, on the other hand, as another embodiment of the present invention, it is possible to set the middle images as multiple regions of interest.

In short, in another embodiment of the present invention, the pixel density measuring unit 130 measures the pixel density for each region of interest. Further, the parameter controlling unit 140 adaptively controls parameters relating to the iterative reconstruction processing performed for every region of interest depending on the measured pixel density for every region of interest.

Hereinafter, we describe measurement methods of the pixel density according to the present invention, with reference to FIG. 3 and FIG. 4.

Figure 3:
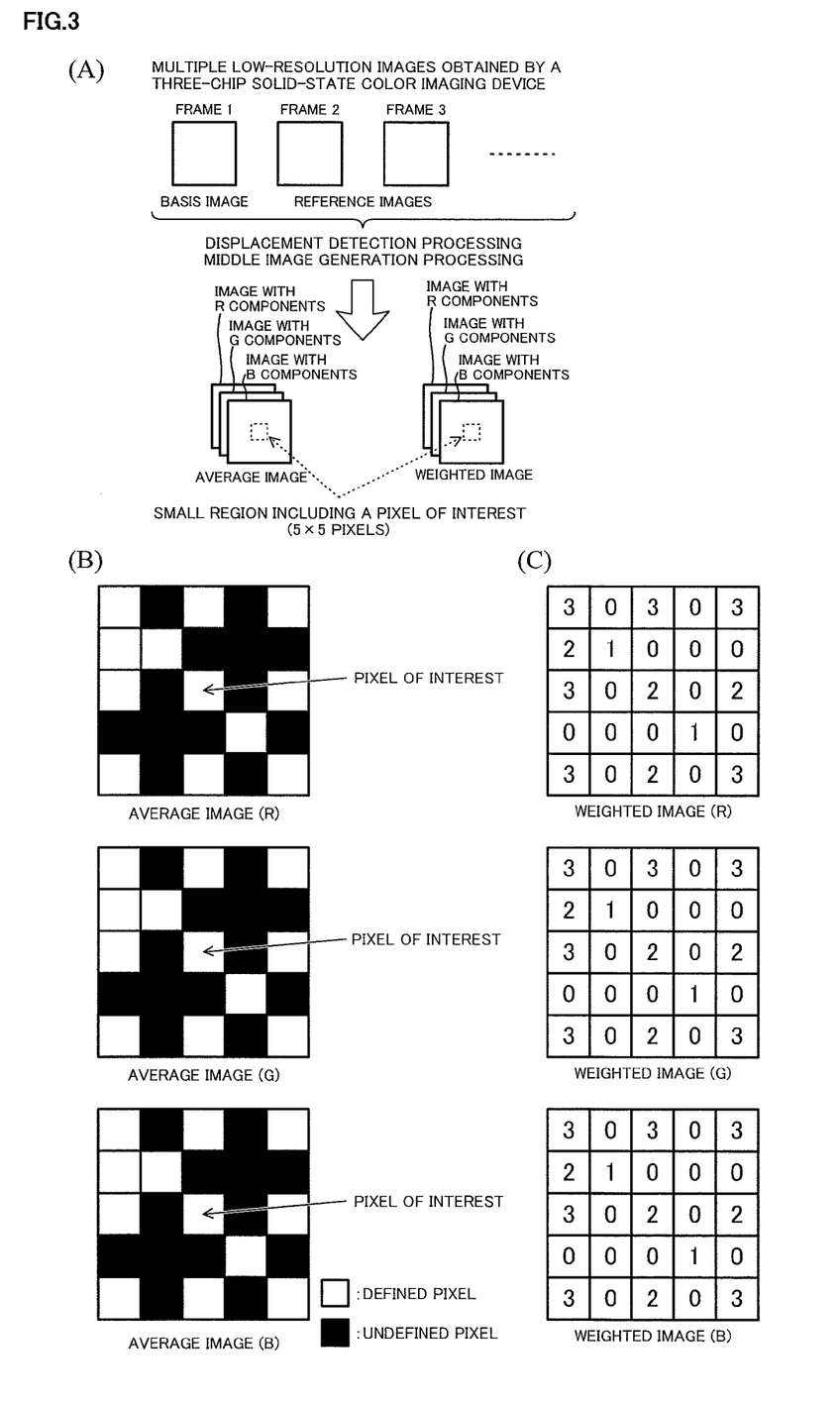
FIG. 3 is a conceptual diagram that illustrates middle images obtained in the case that multiple low-resolution images used in the image processing apparatus of the present invention are images obtained by a three-chip solid-state color imaging device and measurement methods of the pixel density.

FIG. 3 is a conceptual diagram that illustrates middle images obtained in the case that multiple low-resolution images used in the image processing apparatus of the present invention are images obtained by a three-chip solid-state color imaging device and measurement methods of the pixel density.

FIG. 3(A) shows an example in the case of using multiple low-resolution images obtained by a three-chip solid-state color imaging device as multiple low-resolution images used in the image processing apparatus of the present invention. For example, frame 1 is set as a basis image, and other frames (frame 2, frame 3, . . . ) are set as reference images.

As shown in FIG. 3(A), at first, displacements between the basis image and each reference image are detected by the displacement detection processing (see step S100 of FIG. 2), and then the displacement information in the high-resolution image space is computed based on the detected displacements. Next, the average image and the weighted image that include undefined pixels in the high-resolution image space, are generated by the middle image generation processing (see step S110 of FIG. 2) that registers multiple low-resolution images in the high-resolution image space based on the computed displacement information.

As shown in FIG. 3(A), the generated average image is separated into an image with R components (an average image (R)), an image with G components (an average image (G)) and an image with B components (an average image (B)). Further, the generated weighted image is separated into an image with R components (a weighted image (R)), an image with G components (a weighted image (G)) and an image with B components (a weighted image (B)).

The initial image that all pixels become defined pixels is generated by the initial image generation processing (see step S120 of FIG. 2) from the generated average image and the generated weighted image. With respect to that initial image, the iterative reconstruction processing (see step S150 of FIG. 2) is performed based on the parameters that are set depending on the measured pixel densities, and then the high-resolution image is generated.

FIG. 3(B) and FIG. 3(C) show examples of data structures of a small region within the average image and a small region within the weighted image that are in a coordinate position same as the coordinate position of the pixel of interest in the iterative reconstruction processing. Since these examples use multiple low-resolution images obtained by a three-chip solid-state color imaging device, images with R components, images with G components and images with B components, are the same in positions of defined pixels in the average image and the weighted image.

Figure 4:
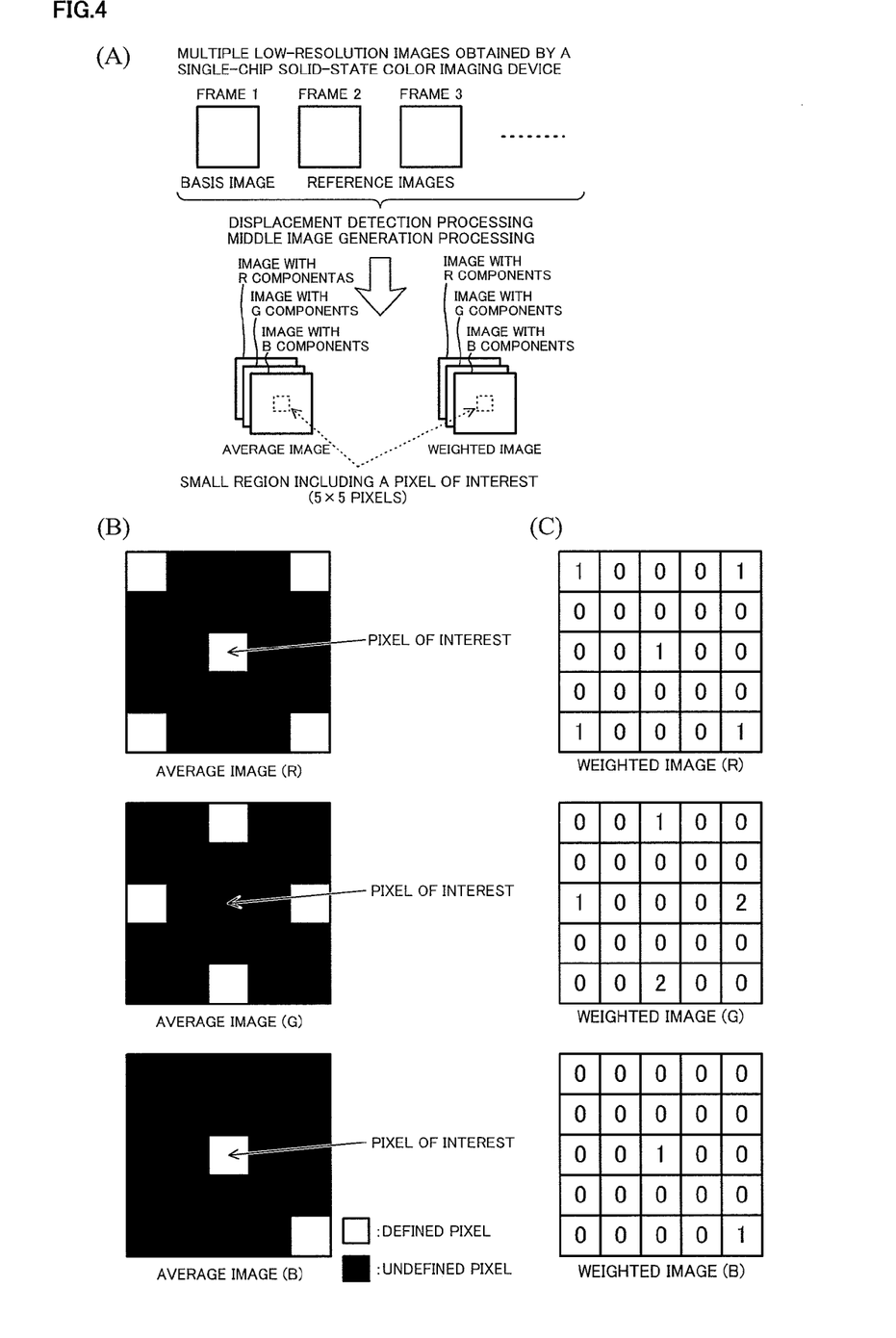
FIG. 4 is a conceptual diagram that illustrates middle images obtained in the case that multiple low-resolution images used in the image processing apparatus of the present invention are images obtained by a single-chip solid-state color imaging device and measurement methods of the pixel density.

FIG. 4 is a conceptual diagram that illustrates middle images obtained in the case that multiple low-resolution images used in the image processing apparatus of the present invention are images obtained by a single-chip solid-state color imaging device and measurement methods of the pixel density.

FIG. 4(A) shows an example in the case of using multiple low-resolution images obtained by a single-chip solid-state color imaging device as multiple low-resolution images used in the image processing apparatus of the present invention. For example, frame 1 is set as a basis image, and other frames (frame 2, frame 3, . . . ) are set as reference images.

As shown in FIG. 4(A), at first, displacements between the basis image and each reference image are detected by the displacement detection processing, and then the displacement information in the high-resolution image space is computed based on the detected displacements. Next, the average image and the weighted image that include undefined pixels in the high-resolution image space, are generated by the middle image generation processing that registers multiple low-resolution images in the high-resolution image space based on the computed displacement information.

As shown in FIG. 4(A), the generated average image is separated into an image with R components (an average image (R)), an image with G components (an average image (G)) and an image with B components (an average image (B)). Further, the generated weighted image is separated into an image with R components (a weighted image (R)), an image with G components (a weighted image (G)) and an image with B components (a weighted image (B)).

The initial image that all pixels become defined pixels is generated by the initial image generation processing from the generated average image and the generated weighted image. With respect to that initial image, the iterative reconstruction processing is performed based on the parameters that are set depending on the measured pixel densities, and then the high-resolution image is generated.

FIG. 4(B) and FIG. 4(C) show examples of data structures of a small region within the average image and a small region within the weighted image that are in a coordinate position same as the coordinate position of the pixel of interest in the iterative reconstruction processing. Since these examples use multiple low-resolution images obtained by a single-chip solid-state color imaging device, images with R components, images with G components and images with B components, are different in positions of defined pixels in the average image and the weighted image.

In the present invention, it is possible to use the same measurement methods of the pixel density, even if multiple low-resolution images are images obtained by a three-chip solid-state color imaging device, or images obtained by a single-chip solid-state color imaging device.

Hereinafter, we concretely describe pixel density measuring methods of the present invention that measure a pixel density for a certain pixel of interest.

{Pixel Density Measuring Method A}

Pixel density measuring method A is a method that measures a pixel density for a certain pixel of interest based on the number of defined pixels of the average image.

{Pixel Density Measuring Method A-1}

Pixel density measuring method A-1 is a method that measures a pixel density for a certain pixel of interest with respect to the aforementioned certain pixel of interest.

As one concrete example of pixel density measuring method A-1, as shown in FIG. 3(B), the pixel density of R component of the pixel of interest is 1, the pixel density of G component of the pixel of interest is 1, the pixel density of B component of the pixel of interest is 1, and the pixel density of RGB components of the pixel of interest is 3.

As another concrete example of pixel density measuring method A-1, as shown in FIG. 4(B), the pixel density of R component of the pixel of interest is 1, the pixel density of G component of the pixel of interest is 0, the pixel density of B component of the pixel of interest is 1, and the pixel density of RGB components of the pixel of interest is 2.

{Pixel Density Measuring Method A-2}

Pixel density measuring method A-2 is a method that measures a pixel density for a certain pixel of interest with respect to a small region including the aforementioned certain pixel of interest.

As one concrete example of pixel density measuring method A-2 (where, the size of the small region including the aforementioned certain pixel of interest is 5×5 pixels.), as shown in FIG. 3(B), the pixel density of R component of the pixel of interest is 12, the pixel density of G component of the pixel of interest is 12, the pixel density of B component of the pixel of interest is 12, and the pixel density of RGB components of the pixel of interest is 36.

As another concrete example of pixel density measuring method A-2, as shown in FIG. 4(B), the pixel density of R component of the pixel of interest is 5, the pixel density of G component of the pixel of interest is 4, the pixel density of B component of the pixel of interest is 2, and the pixel density of RGB components of the pixel of interest is 11.

{Pixel Density Measuring Method B}

Pixel density measuring method B is a method that measures a pixel density for a certain pixel of interest based on the total value of weights of the weighted image.

{Pixel Density Measuring Method B-1}

Pixel density measuring method B-1 is a method that measures a pixel density for a certain pixel of interest with respect to the aforementioned certain pixel of interest.

As one concrete example of pixel density measuring method B-1, as shown in FIG. 3(C), the pixel density of R component of the pixel of interest is 2, the pixel density of G component of the pixel of interest is 2, the pixel density of B component of the pixel of interest is 2, and the pixel density of RGB components of the pixel of interest is 6.

As another concrete example of pixel density measuring method B-1, as shown in FIG. 4(C), the pixel density of R component of the pixel of interest is 1, the pixel density of G component of the pixel of interest is 0, the pixel density of B component of the pixel of interest is 1, and the pixel density of RGB components of the pixel of interest is 2.

{Pixel Density Measuring Method B-2}

Pixel density measuring method B-2 is a method that measures a pixel density for a certain pixel of interest with respect to a small region including the aforementioned certain pixel of interest.

As one concrete example of pixel density measuring method B-2 (where, the size of the small region including the aforementioned certain pixel of interest is 5×5 pixels.), as shown in FIG. 3(C), the pixel density of R component of the pixel of interest is 28, the pixel density of G component of the pixel of interest is 28, the pixel density of B component of the pixel of interest is 28, and the pixel density of RGB components of the pixel of interest is 84.

As another concrete example of pixel density measuring method B-2, as shown in FIG. 4(C), the pixel density of R component of the pixel of interest is 5, the pixel density of G component of the pixel of interest is 6, the pixel density of B component of the pixel of interest is 2, and the pixel density of RGB components of the pixel of interest is 13.

The above description showed concrete examples of the pixel density of each color component (R component or G component or B component) of the pixel of interest and the pixel density of RGB components of the pixel of interest that does not distinguish color components in particular. However, pixel density measuring methods of the pixel of interest according to the present invention, are not limited to those methods. For example, in the present invention, it is also possible to measure a pixel density for a certain pixel of interest based on the pixel density by the combination of color components of the pixel with respect to the aforementioned certain pixel of interest or a small region including the aforementioned certain pixel of interest.

As a concrete example of measuring a pixel density for a pixel of interest, in the case that three values of R component, G component and B component are the defined pixel in a certain coordinate position, it is added as the pixel density, on the other hand, in the case that two values of R component and G component are the defined pixel, and the value of B component is the undefined pixel in a certain coordinate position, it is not added as the pixel density.

Of course, in the case of a pixel having RGB components, as methods that measure the pixel density by the combination of color components of the pixel, it is possible to measure by the following patterns.

Pattern 1:

In the case that three values of R component, G component and B component are the defined pixel in the same coordinate position, it is measured as the pixel density.

Pattern 2:

In the case that two values of R component and G component are the defined pixel in the same coordinate position, it is measured as the pixel density.

Pattern 3:

In the case that two values of G component and B component are the defined pixel in the same coordinate position, it is measured as the pixel density.

Pattern 4:

In the case that two values of R component and B component are the defined pixel in the same coordinate position, it is measured as the pixel density.

Figure 5:
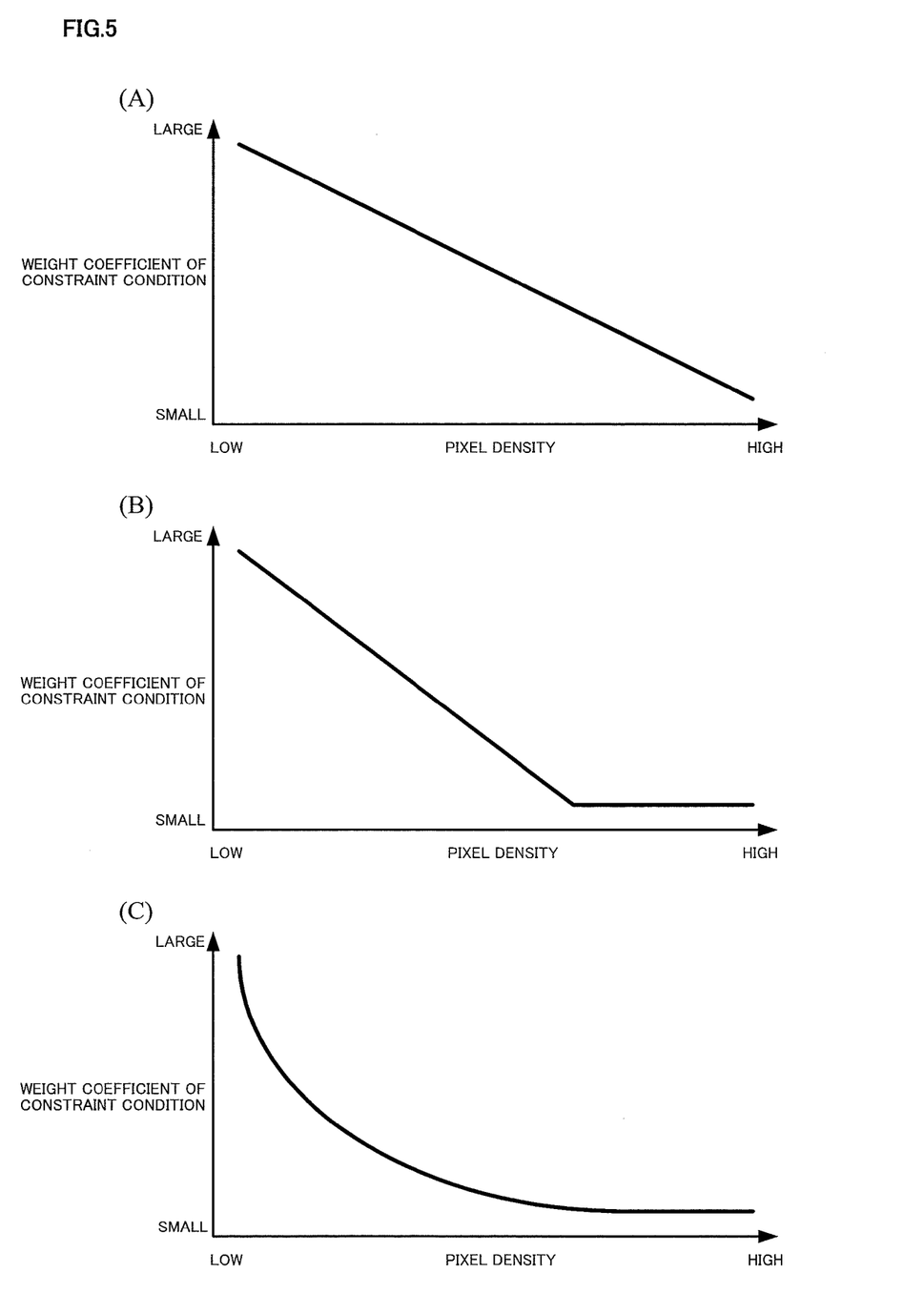
FIG. 5 is a conceptual diagram that illustrates Embodiment 1 (an embodiment that varies the weight coefficient of the constraint condition depending on the pixel density) of a parameter controlling unit of the image processing apparatus according to the present invention.

Hereinafter, we describe embodiments of the parameter controlling unit 140 of the image processing apparatus according to the present invention. FIG. 5 is a conceptual diagram that illustrates Embodiment 1 (an embodiment that varies the weight coefficient of the constraint condition depending on the pixel density) of the parameter controlling unit of the image processing apparatus according to the present invention.

As shown in FIG. 5, the parameter controlling unit 140 adaptively controls the weight coefficient of the constraint condition (the weight coefficient of the constraint condition for smoothness of edges and false color suppression) relating to the iterative reconstruction processing performed for each pixel of interest depending on the measured pixel density of that pixel of interest.

That is to say, in Embodiment 1 of the parameter controlling unit 140, as in three examples shown in FIG. 5(A), FIG. 5(B) and FIG. 5(C), in the case that the pixel density of the pixel of interest is low, the weight coefficient of the constraint condition is set to become large, and in the case that the pixel density of the pixel of interest is high, the weight coefficient of the constraint condition is set to become small.

By the way, a thing that the pixel density is low, means that many undefined pixels are included in the average image, since in the initial image generation processing (see step S120 of FIG. 2) of the initial image generating unit 120, the pixel value of the undefined pixel is generated by an interpolation processing using neighboring defined pixels, the possibility that jagged artifacts and false colors occur in edges of the initial image, is high.

Therefore, in Embodiment 1 of the parameter controlling unit 140 according to the present invention, in the case that the pixel density is low, the weight coefficient of the constraint condition for smoothness of edges and false color suppression relating to the iterative reconstruction processing, is controlled to become large.

On the other hand, a thing that the pixel density is high, means that many defined pixels are included in the average image, the initial image generated by the initial image generation processing (see step S120 of FIG. 2), has few artifacts of edges.

Therefore, in Embodiment 1 of the parameter controlling unit 140 according to the present invention, in the case that the pixel density is high, the weight coefficient of the constraint condition for smoothness of edges and false color suppression relating to the iterative reconstruction processing, is controlled to become small so that the initial image does not blur by the iterative reconstruction processing.

In Embodiment 1 of the parameter controlling unit 140 as described above, although a control of the weight coefficient of the constraint condition is a control of the weight coefficient of the constraint condition for smoothness of edges and false color suppression, the present invention is not limited to that.

Of course, with respect to the control of the weight coefficient of the constraint condition, it is also possible to separately control the weight coefficient of the constraint condition for smoothness of edges and the weight coefficient of the constraint condition for false color suppression. As one example, for example, it is also possible to control the weight coefficient of the constraint condition for smoothness of edges depending on the pixel density of color information (such as G component) to influence luminance greatly, and control the weight coefficient of the constraint condition for false color suppression depending on the pixel density of color information (such as R component and B component) to influence color difference greatly.

The above-mentioned Embodiment 1 of the parameter controlling unit 140, adaptively controls the weight coefficient of the constraint condition relating to the iterative reconstruction processing depending on the pixel density.

On the other hand, Embodiment 2 and Embodiment 3 of the parameter controlling unit described below, adaptively control the termination condition parameter of the iterative reconstruction processing depending to the pixel density. That is to say, in Embodiment 2 of the parameter controlling unit, the iteration count of the iterative reconstruction processing is used as the termination condition parameter of the iterative reconstruction processing. Further, in Embodiment 3 of the parameter controlling unit, the threshold of the convergence condition of the iterative reconstruction processing is used as the termination condition parameter of the iterative reconstruction processing.

Figure 6:
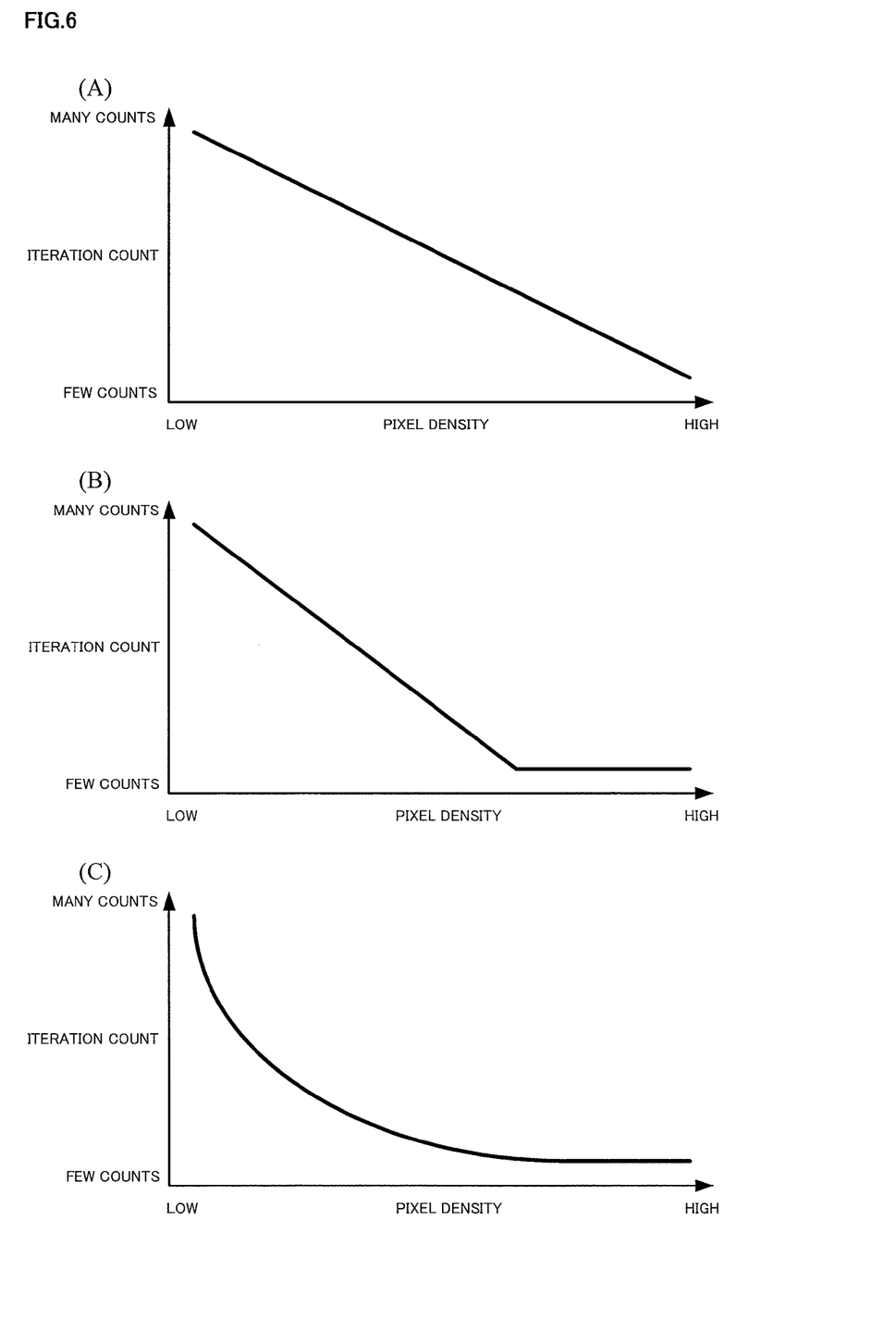
FIG. 6 is a conceptual diagram that illustrates Embodiment 2 (an embodiment that varies the iteration count of the iterative reconstruction processing depending on the pixel density) of a parameter controlling unit of the image processing apparatus according to the present invention.

FIG. 6 is a conceptual diagram that illustrates Embodiment 2 (an embodiment that varies the iteration count of the iterative reconstruction processing depending on the pixel density) of the parameter controlling unit of the image processing apparatus according to the present invention.

As shown in FIG. 6, the parameter controlling unit 140 adaptively controls the iteration count of the iterative reconstruction processing performed for each pixel of interest depending on the measured pixel density of that pixel of interest.

That is to say, in Embodiment 2 of the parameter controlling unit 140, as in three examples shown in FIG. 6(A), FIG. 6(B) and FIG. 6(C), in the case that the pixel density of the pixel of interest is low, the iteration count of the iterative reconstruction processing is set to become many, and in the case that the pixel density of the pixel of interest is high, the iteration count of the iterative reconstruction processing is set to become few.

As described above, a thing that the pixel density is low, means that the possibility that jagged artifacts and false colors occur in edges of the generated initial image is high.

Therefore, in Embodiment 2 of the parameter controlling unit 140 according to the present invention, in the case that the pixel density is low, the iteration count of the iterative reconstruction processing, is controlled to become many.

Further, as described above, a thing that the pixel density is high, means that the generated initial image has few artifacts of edges.

Therefore, in Embodiment 2 of the parameter controlling unit 140 according to the present invention, in the case that the pixel density is high, the iteration count of the iterative reconstruction processing, is controlled to become few so that the initial image does not blur by the iterative reconstruction processing.

Figure 7:
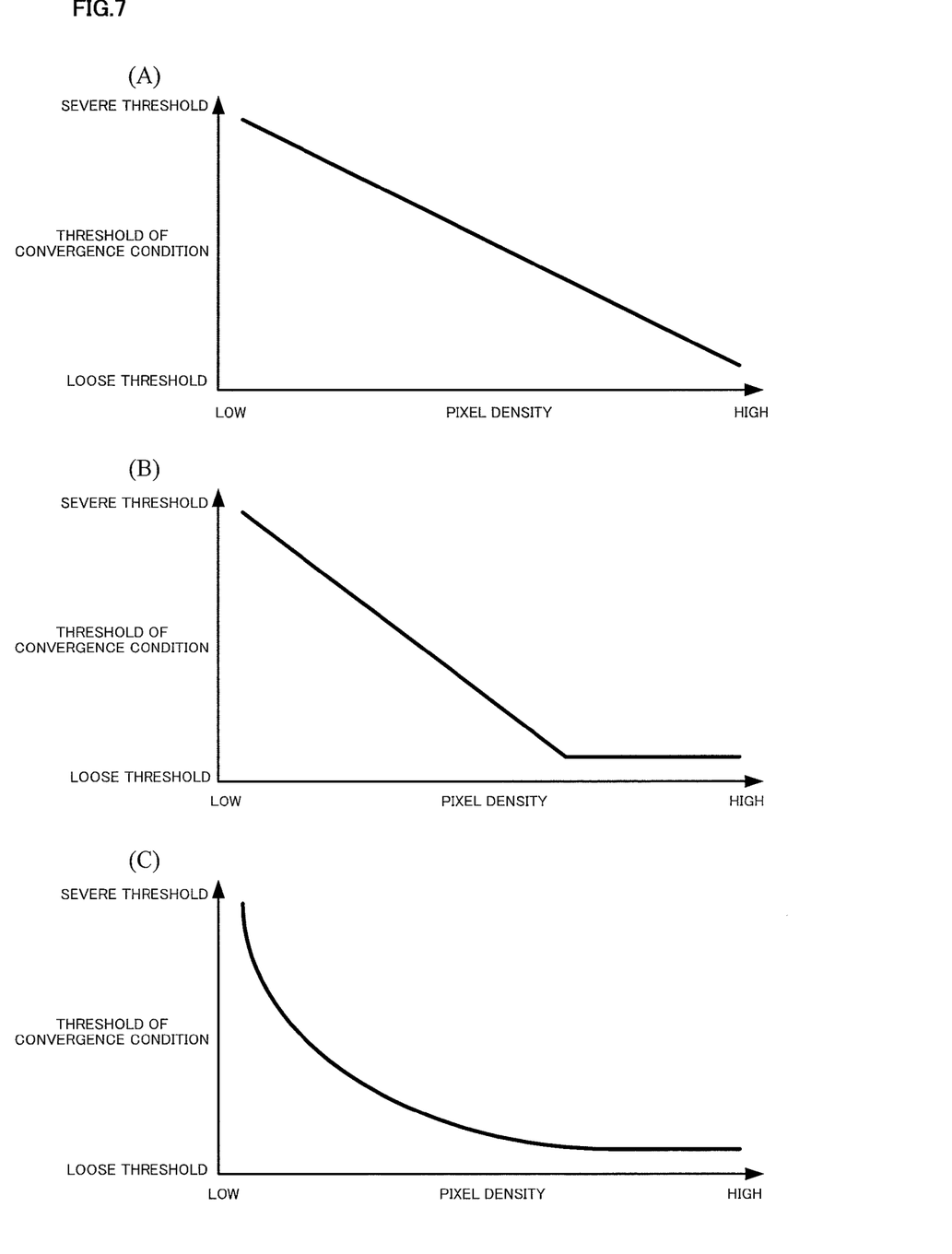
FIG. 7 is a conceptual diagram that illustrates Embodiment 3 (an embodiment that varies the threshold of the convergence condition of the iterative reconstruction processing depending on the pixel density) of a parameter controlling unit of the image processing apparatus according to the present invention.

FIG. 7 is a conceptual diagram that illustrates Embodiment 3 (an embodiment that varies the threshold of the convergence condition of the iterative reconstruction processing depending on the pixel density) of the parameter controlling unit of the image processing apparatus according to the present invention.

As shown in FIG. 7, the parameter controlling unit 140 adaptively controls the threshold of the convergence condition of the iterative reconstruction processing performed for each pixel of interest depending on the measured pixel density of that pixel of interest.

That is to say, in Embodiment 3 of the parameter controlling unit 140, as in three examples shown in FIG. 7(A), FIG. 7(B) and FIG. 7(C), in the case that the pixel density of the pixel of interest is low, the threshold of the convergence condition of the iterative reconstruction processing (as an example, the variation of the iterative reconstruction processing) is set to become severe (small), and in the case that the pixel density of the pixel of interest is high, the threshold of the convergence condition of the iterative reconstruction processing is set to become loose (the variation of the iterative reconstruction processing is set to become large).

Hereinafter, we describe embodiments of the iterative reconstruction processing unit 150 of the image processing apparatus according to the present invention. In addition, there is an assumption that a parameter relating to the iterative reconstruction processing that is used in Embodiment 1 and Embodiment 2 of the iterative reconstruction processing unit 150 described below, is set by Embodiment 2 of the parameter controlling unit 140.

That is to say, the parameter relating to the iterative reconstruction processing that is used in Embodiment 1 and Embodiment 2 of the iterative reconstruction processing unit 150 described below, is the iteration count of the iterative reconstruction processing that is set depending on the pixel density.

Figure 8:
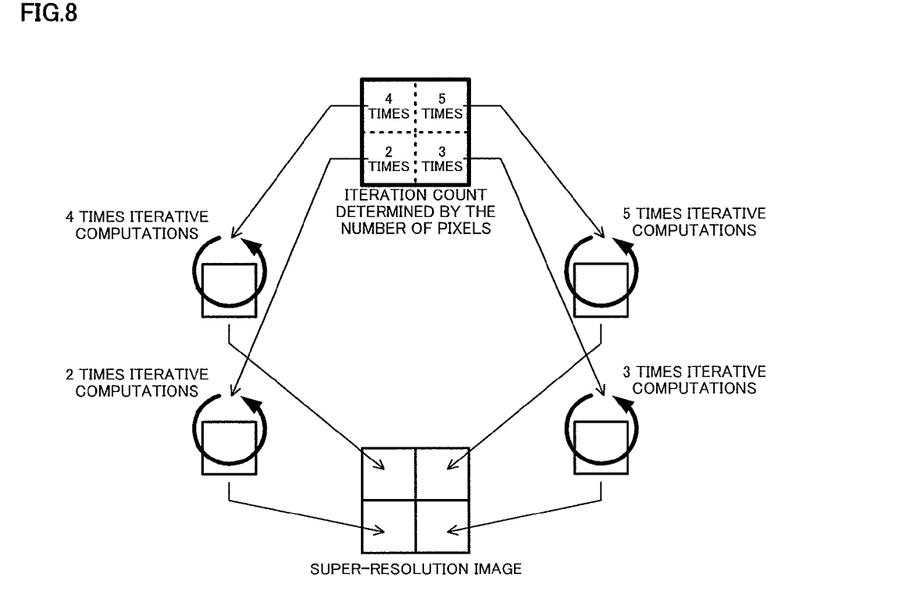
FIG. 8 is a conceptual diagram that illustrates Embodiment 1 of an iterative reconstruction processing unit of the image processing apparatus according to the present invention.

FIG. 8 is a conceptual diagram that illustrates Embodiment 1 of the iterative reconstruction processing unit 150 of the image processing apparatus according to the present invention.

As shown in FIG. 8, Embodiment 1 of the iterative reconstruction processing unit 150 reads out the initial image from the memory unit 160, and then performs the iterative reconstruction processing separately with respect to the read-out initial image based on the iteration count that is set in the parameter controlling unit 140 for every pixel of interest or every region of interest, and finally generates one high-resolution image by synthesizing result images obtained by each iterative reconstruction processing.

Figure 9:
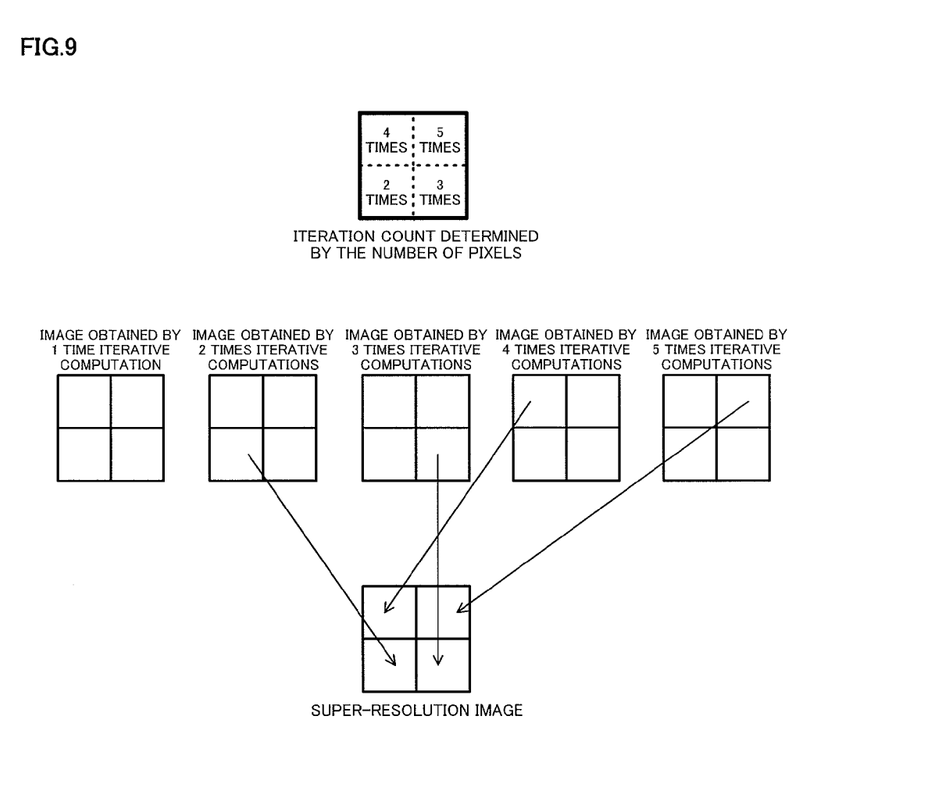
FIG. 9 is a conceptual diagram that illustrates Embodiment 2 of an iterative reconstruction processing unit of the image processing apparatus according to the present invention.

FIG. 9 is a conceptual diagram that illustrates Embodiment 2 of the iterative reconstruction processing unit 150 of the image processing apparatus according to the present invention. In addition, there is an assumption that the memory unit 160 has the capacity capable of storing many images in Embodiment 2 of the iterative reconstruction processing unit 150.

As shown in FIG. 9, before generating one high-resolution image by the iterative reconstruction processing unit 150, images generated by performing the iterative reconstruction processing of the iteration count that it can be set in the parameter controlling unit 140 with respect to the whole initial image (i.e. images after the iterative reconstruction processing of the predetermined iteration count), are preliminarily stored in the memory unit 160.

And then, Embodiment 2 of the iterative reconstruction processing unit 150 reads out images after each iterative reconstruction processing stored in the memory unit 160 based on the iteration count that is set in the parameter controlling unit 140 for every pixel of interest or every region of interest, and generates one high-resolution image by synthesizing the images after each iterative reconstruction processing corresponding to each pixel of interest or each region of interest.

As described above, we explained the preferred embodiment of the image processing apparatus according to the present invention in detail. Hereinafter, we describe a parameter control processing apparatus according to the present invention.

An embodiment of the parameter control processing apparatus according to the present invention, is constituted by removing the initial image generating unit 120 and the iterative reconstruction processing unit 150 from the image processing apparatus according to the present invention shown in FIG. 1.

That is to say, the parameter control processing apparatus according to the present invention comprises the registration processing unit 100 shown in FIG. 1, the middle image generating unit 110 shown in FIG. 1, the pixel density measuring unit 130 shown in FIG. 1, the parameter controlling unit 140 shown in FIG. 1 and the memory unit 160 shown in FIG. 1, and adaptively controls parameters relating to the image processing depending on pixel densities of the image data (middle images) obtained by registering multiple low-resolution images in the high-resolution image space.

Since the registration processing unit 100, the middle image generating unit 110, the pixel density measuring unit 130, the parameter controlling unit 140 and the memory unit 160 of the parameter control processing apparatus according to the present invention correspond to those of the image processing apparatus according to the present invention, the description of those is omitted.

Here, we describe the process flow of the parameter control processing apparatus according to the present invention.

The parameter control processing apparatus according to the present invention, at first, computes displacement information in the high-resolution image space that is used for registering multiple low-resolution images in the high-resolution image space by the registration processing unit 100. Furthermore, the displacement information in the high-resolution image space that is computed in the registration processing unit 100, is input into the middle image generating unit 110.

Next, the middle image generating unit 110 reads out multiple low-resolution images from the memory unit 160, and then generates an average image and a weighted image that include undefined pixels in the high-resolution image space by registering the multiple low-resolution images which were read out in the high-resolution image space based on the displacement information in the high-resolution image space that is input.

Next, the pixel density measuring unit 130 reads out the average image and the weighted image that include undefined pixels from the memory unit 160, sets all pixels from the read-out average image and the read-out weighted image that include undefined pixels as the pixel of interest respectively, and then measures the pixel density for each pixel of interest. Further, pixel densities of all pixels of the middle images that are measured in the pixel density measuring unit 130, are input into the parameter controlling unit 140.

Finally, based on the pixel densities of all pixels of the middle images that are input, the parameter controlling unit 140 adaptively controls parameters relating to the predetermined image processing depending on the pixel density of each pixel of interest.

As described above, we described the process flow of the parameter control processing apparatus according to the present invention. In addition, parameters of all pixels that are controlled (set) by the parameter controlling unit 140 of the parameter control processing apparatus according to the present invention, are used in the predetermined image processing (as one example, the image quality improvement processing such as the super-resolution processing).

Furthermore, it is possible to implement the parameter control processing apparatus and the image processing apparatus of the present invention in electronic imaging devices (digital imaging devices such as single-chip solid-state color imaging devices and three-chip solid-state color imaging devices) and image systems.

Moreover, by using a computer system, the parameter control processing apparatus and the image processing apparatus of the present invention can be implemented by software (computer programs). And then, of course, the parameter control processing apparatus and the image processing apparatus of the present invention can also be implemented by hardware such as ASIC (Application Specific Integrated Circuit), GPU (Graphics Processing Unit) and FPGA (Field Programmable Gate Array).

Industrial Applicability

When generating one high-resolution image from multiple low-resolution images by the super-resolution processing (an iterative reconstruction processing) based on a reconstruction-based super-resolution processing method, the present invention adaptively controls parameters relating to the iterative reconstruction processing (such as the weight coefficient of the constraint condition for smoothness of edges and false color suppression, the iteration count of the iterative reconstruction processing and the threshold of the convergence condition of said iterative reconstruction processing) depending on pixel densities of middle images obtained by registering the multiple low-resolution images in the high-resolution image space, and performs the iterative reconstruction processing based on the adaptively-controlled parameters. According to the present invention, an excellent effect that is capable of effectively generating one high-resolution image with high image quality (i.e. generating one high-resolution image having sharp edges and few false colors based on a low cost computation), is played.

<List of References>

Patent Document 1:

International Publication Number WO/2004/063991

Non-Patent Document 1:

David Capel, "Image Mosaicing and Super-resolution", Springer, 2004.

Non-Patent Document 2:

S. C. Park, M. K. Park and M. G. kang, "Super-Resolution Image Reconstruction: A Technical Overview", IEEE signal processing Magazine, Vol. 20, No. 3, p. 21-36, 2003.

What is claimed is:

1. A parameter control processing apparatus that is used in an image processing apparatus performing a predetermined image processing based on multiple low-resolution images having displacements, said parameter control processing apparatus characterized by comprising:

a registration processing unit for computing displacement information in a high-resolution image space that is used for registering said multiple low-resolution images in said high-resolution image space;

a middle image generating unit for generating middle images by registering said multiple low-resolution images in said high-resolution image space based on said computed displacement information in said high-resolution image space;

a pixel density measuring unit for measuring pixel densities of said generated middle images; and a parameter controlling unit for adaptively controlling parameters relating to said predetermined image processing depending on said measured pixel densities of said middle images.

2. The parameter control processing apparatus according to claim 1, wherein said middle images are an average image and a weighted image that include undefined pixels in said high-resolution image space.

3. A parameter control processing method that is used in an image processing apparatus performing a predetermined image processing based on multiple low-resolution images having displacements, said parameter control processing method characterized by comprising:

a registration processing step for computing displacement information in a high-resolution image space that is used for registering said multiple low-resolution images in said high-resolution image space;

a middle image generating step for generating middle images by registering said multiple low-resolution images in said high-resolution image space based on said computed displacement information in said high-resolution image space;

a pixel density measuring step for measuring pixel densities of said generated middle images; and a parameter controlling step for adaptively controlling parameters relating to said predetermined image processing depending on said measured pixel densities of said middle images.

4. The parameter control processing method according to claim 3, wherein said middle images are an average image and a weighted image that include undefined pixels in said high-resolution image space.

5. An image processing apparatus for generating a high-resolution image from multiple low-resolution images having displacements by an iterative reconstruction processing based on a reconstruction-based super-resolution processing method, said image processing apparatus characterized by comprising:

a registration processing unit for computing displacement information in a high-resolution image space that is used for registering said multiple low-resolution images in said high-resolution image space;

a middle image generating unit for generating middle images by registering said multiple low-resolution images in said high-resolution image space based on said computed displacement information in said high-resolution image space;

an initial image generating unit for generating an initial image that all pixels are defined pixels based on said middle images;

a pixel density measuring unit for measuring pixel densities of said generated middle images;

a parameter controlling unit for adaptively controlling parameters relating to said iterative construction processing depending on said measured pixel densities of said middle images; and an iterative reconstruction processing unit for generating said high-resolution image by performing said iterative construction processing based on said parameters with respect to said initial image.

6. The image processing apparatus according to claim 5, wherein said middle image generating unit generates an average image and a weighted image that include undefined pixels in said high-resolution image space by arranging each pixel of said multiple low-resolution images and its weight in said high-resolution image space respectively based on said computed displacement information in said high-resolution image space, said generated average image and said generated weighted image are said middle images.

7. The image processing apparatus according to claim 6, wherein said parameter is a weight coefficient of a constraint condition for smoothness of edges and false color suppression relating to said iterative reconstruction processing, said parameter controlling unit varies said weight coefficient of said constraint condition depending on said pixel density.

8. The image processing apparatus according to claim 6, wherein said parameter is a termination condition parameter of said iterative reconstruction processing, said parameter controlling unit varies said termination condition parameter depending on said pixel density.

9. The image processing apparatus according to claim 8, wherein said termination condition parameter is iteration count of said iterative reconstruction processing.

10. The image processing apparatus according to claim 8, wherein said termination condition parameter is a threshold of a convergence condition of said iterative reconstruction processing.

11. The image processing apparatus according to claim 6, wherein said pixel density measuring unit sets all pixels of said middle images as a pixel of interest respectively, and measures a pixel density for each pixel of interest.

12. The image processing apparatus according to claim 11, wherein said pixel density measuring unit measures a pixel density for a certain pixel of interest based on the number of defined pixels of said average image in said certain pixel of interest.

13. The image processing apparatus according to claim 11, wherein said pixel density measuring unit measures a pixel density for a certain pixel of interest based on the number of defined pixels of said average image in a small region including said certain pixel of interest.

14. The image processing apparatus according to claim 11, wherein said pixel density measuring unit measures a pixel density for a certain pixel of interest based on a total value of weights of said weighted image in said certain pixel of interest.

15. The image processing apparatus according to claim 11, wherein said pixel density measuring unit measures a pixel density for a certain pixel of interest based on a total value of weights of said weighted image in a small region including said certain pixel of interest.

16. The image processing apparatus according to claim 6, wherein said pixel density measuring unit sets said middle images as multiple regions of interest, and measures a pixel density for each region of interest.

17. An image processing method for generating a high-resolution image from multiple low-resolution images having displacements by an iterative reconstruction processing based on a reconstruction-based super-resolution processing method, said image processing method characterized by comprising:

a registration processing step for computing displacement information in a high-resolution image space that is used for registering said multiple low-resolution images in said high-resolution image space;

a middle image generating step for generating middle images by registering said multiple low-resolution images in said high-resolution image space based on said computed displacement information in said high-resolution image space;

an initial image generating step for generating an initial image that all pixels are defined pixels based on said middle images;

a pixel density measuring step for measuring pixel densities of said generated middle images;

a parameter controlling step for adaptively controlling parameters relating to said iterative construction processing depending on said measured pixel densities of said middle images; and an iterative reconstruction processing step for generating said high-resolution image by performing said iterative construction processing based on said parameters with respect to said initial image.

18. The image processing method according to claim 17, wherein
said middle image generating step generates an average image and a weighted image that include undefined pixels in said high-resolution image space by arranging each pixel of said multiple low-resolution images and its weight in said high-resolution image space respectively based on said computed displacement information in said high-resolution image space,
said generated average image and said generated weighted image are said middle images.

19. The image processing method according to claim 18, wherein
said parameter is a weight coefficient of a constraint condition for smoothness of edges and false color suppression relating to said iterative reconstruction processing, said parameter controlling step varies said weight coefficient of said constraint condition depending on said pixel density.

20. The image processing method according to claim 18, wherein
said parameter is a termination condition parameter of said iterative reconstruction processing,
said parameter controlling step varies said termination condition parameter depending on said pixel density.

21. The image processing method according to claim 20, wherein said termination condition parameter is iteration count of said iterative reconstruction processing.

22. The image processing method according to claim 20, wherein said termination condition parameter is a threshold of a convergence condition of said iterative reconstruction processing.

* * * * *